United States Patent [19]

Peter

[11] Patent Number: 5,291,109
[45] Date of Patent: Mar. 1, 1994

[54] WINDSHIELD WIPER SYSTEM

[75] Inventor: Cornelius Peter, Ottersweiher, Fed. Rep. of Germany

[73] Assignee: Robert Bosch GmbH, Stuttgart, Fed. Rep. of Germany

[21] Appl. No.: 950,509

[22] PCT Filed: Mar. 11, 1991

[86] PCT No.: PCT/DE91/00388
§ 371 Date: Sep. 25, 1992
§ 102(e) Date: Sep. 25, 1992

[87] PCT Pub. No.: WO91/19631
PCT Pub. Date: Dec. 26, 1991

[30] Foreign Application Priority Data

Jun. 12, 1990 [DE] Fed. Rep. of Germany ........ 4018713

[51] Int. Cl.$^5$ .................................................. B60S 1/08
[52] U.S. Cl. ................................ 318/443; 318/268; 318/432; 318/DIG. 2; 388/819
[58] Field of Search ............... 318/443, 444, DIG. 2, 318/268, 432, 433; 15/250.17; 388/816, 819

[56] References Cited

U.S. PATENT DOCUMENTS

| | | |
|---|---|---|
| 3,086,238 | 4/1963 | Baumhart . |
| 3,573,584 | 4/1971 | Kearns . |
| 3,602,790 | 8/1971 | Kearns ........................... 318/379 X |
| 3,737,750 | 6/1973 | Kearns ............................. 318/443 |
| 4,314,186 | 2/1982 | Gille et al. ........................ 318/434 |
| 4,423,362 | 12/1983 | Konrad et al. . |
| 4,499,410 | 2/1985 | Iacoponi et al. ................... 318/444 |
| 4,544,870 | 10/1985 | Kearns et al. ..................... 318/444 |
| 4,588,934 | 5/1986 | Suzuki et al. ..................... 318/449 |
| 4,625,157 | 11/1986 | Phillimore ........................ 318/443 |

FOREIGN PATENT DOCUMENTS

| | | |
|---|---|---|
| 2637934 | 2/1977 | Fed. Rep. of Germany . |
| 2852676 | 6/1980 | Fed. Rep. of Germany . |
| 3208121 | 9/1983 | Fed. Rep. of Germany . |
| 59-226690 | 12/1984 | Japan . |
| 60-82467 | 5/1985 | Japan . |
| 1012392 | 4/1983 | U.S.S.R. . |

*Primary Examiner*—Bentsu Ro
*Attorney, Agent, or Firm*—Spencer, Frank & Schneider

[57] ABSTRACT

A windshield wiper system (10) which includes an electrical drive motor (12) that makes available a driving moment for at least one windshield wiper (16) performing a back and forth movement on a pane to be cleaned. A signal processing arrangement (20) is provided which, by way of an electrical switching stage (18), controls or regulates the rotation rate of the drive motor (12) to a constant value.

6 Claims, 1 Drawing Sheet

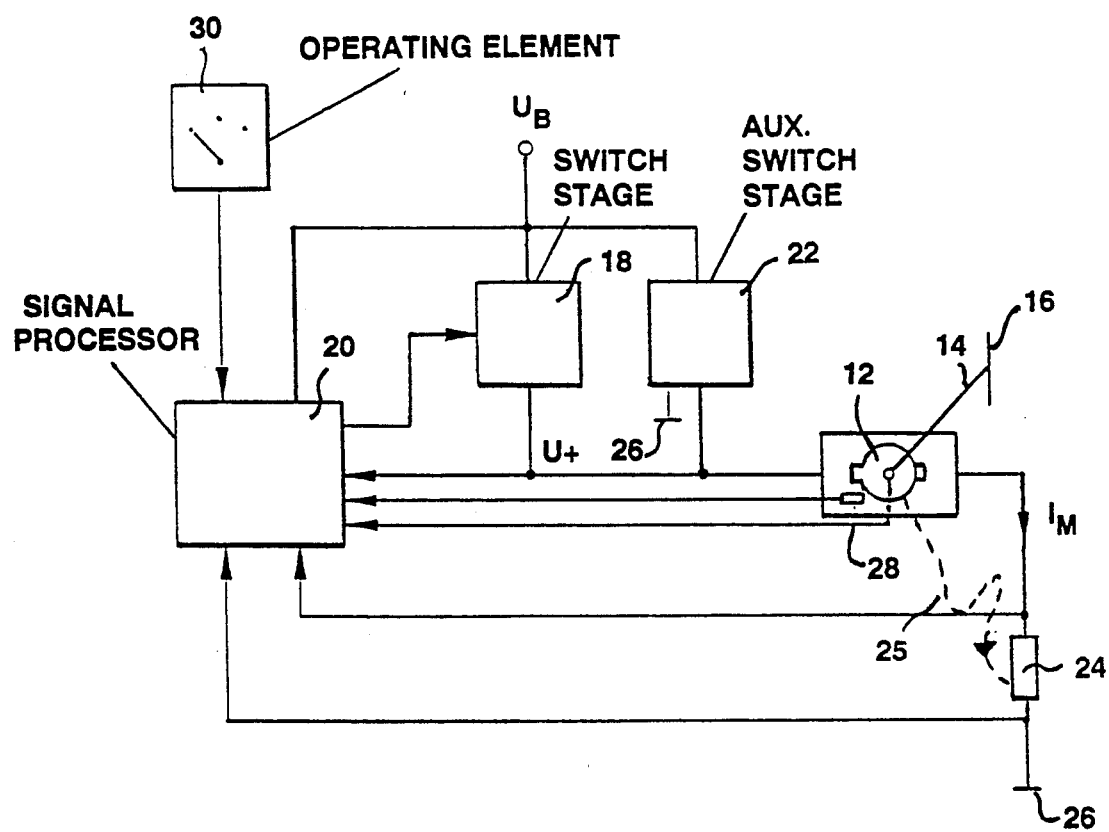

WINDSHIELD WIPER SYSTEM

STATE OF THE ART

The invention is based on a windshield wiper system of the type including at least one electrical drive motor that makes available a driving moment for at least one windshield wiper performing a back and forth movement on a pane to be cleaned. A windshield wiper driven by an electric motor and performing a back and forth movement on a pane to be cleaned has a varying requirement for torque during a wiping cycle, for example, with this requirement being a function of the state of the pane to be cleaned and of the position of the windshield wiper. A great change in the torque requirement occurs in the reversal positions of the windshield wiper since there the required driving moment temporarily takes on the value of zero. The different torque requirement during a wiping cycle leads to differences in load on the drive motor which influence the noise development of the motor. The short-term absence of driving torque in the reversal positions, particularly in the increasingly employed small, high speed electric motors, leads to a temporary increase in the rate of rotation which is considered to be particularly annoying.

It is the object of the invention to reduce the noise development of such windshield wiper systems.

SUMMARY OF THE INVENTION

The above object is generally achieved according to the present invention by a windshield wiper system including at least one electrical drive motor that makes available a driving moment for at least one windshield wiper performing a back and forth movement on a pane to be cleaned, and a signal processing arrangement which, via an electrical switching stage, controls the rotation rate of the motor to a constant value, with the switching stage determining the operating voltage ($U_+$) of the motor as a function of the current ($I_M$) flowing through the motor.

ADVANTAGES OF THE INVENTION

Regulation of the rotation rate as well as the control of the rotation rate of the electric windshield wiper drive motor according to the invention reduce the noise development of the drive. The difference between control and regulation of the rotation rate lies in that regulation includes means for detecting the rate of rotation of the motor so as to put out a signal to a signal processing arrangement. A control is able to operate without this report of the rate of rotation and can therefore be realized more economically. The regulation of the rate of rotation of the motor permits the input of a desired rotation rate value while the control keeps the rate of rotation essentially constant, with the precise value of the rate of rotation being of subordinate significance. Significant for the invention is the avoidance of greater changes in the rate of rotation during wiping operation.

Keeping the rate of rotation of the drive motor constant reduces, particularly in the reversal positions of the windshield wiper, the noise from the drive. A change in the noise, to which the human ear reacts with particular sensitivity, is substantially avoided.

Another advantage of regulation or control of the rate of rotation of the electric drive motor results from the possibility of providing different wiping speeds which are set electronically with the aid of the signal processing arrangement. The action on the motor practiced in the past, for example, the use of a collector direct current motor having three instead of two brushes, is no longer required. The omission of the third brush further reduces noise development and increases the efficiency of the drive. The electronic control reduces the costs for interference suppression for the electric motor which might have to be implemented.

Advantageous modifications and improvements of the basic system according to the inventor are disclosed.

A first advantageous modification provides for the derivation of a value that is proportional to the rate of rotation of the electric motor from the electromotor countervoltage of the motor. This voltage can be measured at a motor that is operated as a generator. Generator operation during windshield wiper operation can be cyclically repeated by using pulsed operation in which the drive motor is connected with the operating voltage with a defined pulse to pause ratio. The countervoltage of the electric motor can be measured by the signal processing arrangement during the pulse pauses and can be converted into a corresponding rotation rate signal.

An advantageous possibility for at least controlling the rate of rotation of the electric motor is given by the current flowing through the motor. This possibility is based on the fact that the driving moment is approximately proportional to the motor current. The signal processing arrangement puts out the operating voltage of the electric motor as a function of the desired rotation rate and the current flowing through the motor as well as a function of the known internal resistance of the electric motor.

An advantageous feature of the system according to the invention relates to the measuring of the current flowing through the electric motor with the aid of an electrical resistance that is disposed in the immediate vicinity of the electric motor. With this measure it is possible to correct the influence of the operating temperature on the motor characteristics simultaneously with regulating or controlling the rotation rate of the motor. Without a correction, an increase in temperature would lead to a drop in the rotation rate during controlled operation. This measure can further be utilized to realize a protection against excess temperatures. Instead of detecting the temperature by way of a measuring resistor for the current flowing through the motor, a temperature sensor may be provided that is associated with the motor and emits an output signal to the signal processing arrangement.

An advantageous modification provides for a redundancy of the motor current supply which, in normal operation, is effected by a switching stage that is actuated by the signal processing arrangement and includes the electrical power component for the motor. The additional switching stage required for this purpose is able to detect, for example, the operating voltage present at the drive motor and, if a predetermined value is not reached, take over the energy supply. The predeterminable value of the switching threshold preferably lies slightly below the value of the minimum operating voltage of the electric motor provided for the lowest wiping speed.

Further advantageous modifications and improvements will become evident from further dependent claims in conjunction with the description below.

BRIEF DESCRIPTION OF THE DRAWINGS

The sole drawing figure depicts a block circuit diagram for a windshield wiper system according to the invention.

DETAILED DESCRIPTION OF THE PREFERRED EMBODIMENT

Windshield wiper system 10 includes an electrical drive motor 12 which actuates a windshield wiper 16 by way of a drive mechanism 14. To supply motor 12 with energy, a switching stage 18 is provided which receives a control signal from a signal processing arrangement 20. Switching stage 18 lies at a supply voltage $U_B$ and makes available an operating voltage $U_+$ for motor 12. The signal processing arrangement 20 as well as an additional switching stage 22 are also connected to supply voltage $U_B$. The line which is connected to the operating voltage $U_+$ of the motor 12, is connected, in addition to motor 12, also with signal processing arrangement 20 and the additional switching stage 22.

The current $I_M$ flowing through motor 12 is determined in arrangement 20 with the aid of the voltage drop across a resistor 24. Resistor 24 is connected to ground 26. Motor 12 has an associated temperature sensor 28 which feeds a signal to arrangement 20. Means are also provided for directly detecting the rate of rotation of motor 12. These means are shown in the drawing by way of a line leading from the motor shaft to arrangement 20 for transmitting the rotation rate signal. Signal processing arrangement 20 is further connected with an operator element 30.

The windshield wiper system 10 according to the invention operates as follows:

By way of a drive mechanism 14, the electric drive motor 12 actuates windshield wiper 16 which performs a back and forth movement on a pane that is not shown in the drawing. Instead of a motor 12 and a windshield wiper 16, a plurality of motors 12 and a plurality of windshield wipers 16 may also be provided. In conjunction with switching stage 18, signal processing arrangement 20 is initially provided to keep the rotation rate of motor 12 constant during the wiping process. Keeping the rotation rate constant results in a reduction in noise and particularly in a reduction of changes in the noise. Changes in the rotation rate result from the changing torque during a wiping cycle. The greatest amount of change occurs in the reversal positions of windshield wiper 16 where the required driving torque briefly becomes zero. The rotation rate of the briefly relieved motor 12 could then briefly rise. These changes in the rotation rate of the electric drive motor 12 are prevented by regulating or at least controlling the rate of rotation.

As the simplest measure for regulating the rotation rate, means are provided to detect the rotation rate of motor 12. These means pass the actual rotation rate to signal processing arrangement 20. Arrangement 20 compares the actual rotation rate with a predeterminable desired value and actuates switching stage 18 in such a way that the desired rotation rate is realized. Instead of controlling the operating voltage $U_+$, it is also possible to change the pulse to pause ratio that occurs in the so-called pulsed operation. In this pulsed operation the motor is connected with a comparatively high frequency pulse-shaped clock signal at operating voltage $U_B$. By way of the pulse to pause ratio, the average electrical energy is predetermined. Compared to an analog input of $U_+$, pulsed operation increases the electrical efficiency of the wiper system as well as the torque to be put out at low rotation rates.

Instead of a special rotation rate sensor, the electromotor countervoltage occurring in motor 12 may also be employed as a measure for the rotation rate of the motor; it can be measured during generator operation of motor 12. In pulsed operation, generator operation occurs during the pulse pause. For that reason, the line in which operating voltage $U_+$ is present is shown in the drawing figure as being connected with signal processing arrangement 20. The electromotor countervoltage induced in motor 12 during generator operation is an accurate measure for the rate of rotation. It is therefore possible to regulate the rotation rate to a predetermined value even without a special rotation rate sensor.

A simple possibility for at least controlling the motor rotation rate is given by measuring the current flowing through motor 12. The rotation rate of motor 12 is proportional to the internal motor voltage $U_M$. Likewise, the moment M put out by motor 12 is at least approximately proportional to the current $I_M$ flowing through motor 12. It is thus possible to change the motor characteristic, which represents the rotation rate as a function of torque, to the electrical equivalent values of motor 12 and this results in the characteristic $U_M = U_B - Ri \times I_M$, where Ri is the internal resistance of the motor which can be determined from $U_B/I_K$. The short-circuit current of the motor which may be given by the manufacturer or can be determined by way of a measurement is marked $I_K$. In order to obtain a constant motor rotation rate independent of the driving torque, $U_M$ must be kept constant. The operating voltage $U_+$ of motor 12 must follow correspondingly. The operating voltage $U_+$ must meet the condition $U_+ = U_M + (U_B/I_K \times I_M)$. Different wiping speeds and consequently different desired rotation rates can be predetermined by different values for $U_M$. If the desired rotation rate is fixed, the operating voltage $U_+$ to be given for motor 12 is then dependent only on the motor current $I_M$ to be determined. The rotation rate can be adjusted as long as the value to be given for operating voltage $U_+$ does not exceed the value of the available operating voltage $U_B$. A desired rotation rate cannot be precisely predetermined in controlled operation. The approximate value of the desired rotation rate as a function of the measured current $I_M$ can be determined experimentally. Significant is that the rotation rate is kept constant during controlled operation.

An advantageous feature relates to the arrangement of a resistor 24 in the immediate vicinity of the motor. With this measure it is possible to correct the temperature influence on the electrical parameters of the electric drive motor 12 so as to thermally couple the resistor to the motor as indicated by the dashed line 25 existing therebetween in signal processing arrangement 20. Particularly advantageous is the realization of resistor 24 as a correspondingly calculated copper conductor on a printed circuit. The temperature coefficients of the armature winding of electric motor 12 and of resistor 24 are thus identical and permit a particularly simple correction of the temperature influence without further measures. Additionally, the operating temperature can be monitored by means of a separate temperature sensor 28 which is arranged directly adjacent to the motor. The monitoring of the operating temperature of motor 12 constitutes an effective protection against thermal overloads which may occur, for example, upon a short-circuit or if the drive mechanism 14 is blocked.

If switching stage 18 which includes electronic power components is malfunctioning, the additional switching stage 22 takes over the energy supply for electrical drive motor 12 and thus permits at least the maintenance of emergency operation of the windshield wiper system 10. The additional switching stage 22 includes, for example, a voltage comparison circuit which compares operating voltage $U_+$ with respect to ground 26. If the measured value lies below the operating voltage $U_+$ to be given for the smallest pre-selected rotation rate corresponding to the slowest wiping speed of windshield wiper 16, a defect in switching stage 18 can be assumed to exist. Without further measures, additional switching stage 22 is able to set an operating voltage $U_+$ that almost corresponds to the required operating voltage $U_+$ for operation at the slowest wiping speed to be set. With a slightly greater amount of electronic circuitry, it is also possible to completely replace switching stage 18 by the additional switching stage 22 which then is also able to make available the full operating voltage $U_+$ for operation at maximum wiping speed.

Operating element 30 is intended for switching the windshield wiper system 10 on and off and for preselecting a wiping speed or for intermittent operation. Operating element 30 is preferably connected with signal processing arrangement 20 which controls switching stage 18 according to the preselected operating mode.

I claim:

1. A windshield wiper system comprising at least one electrical drive motor that makes available a driving moment for at least one windshield wiper performing a back and forth movement on a pane to be cleaned, and a signal processing arrangement which by way of an electrical switching stage controls the rotation rate of the motor to a constant value, said switching stage determining the operating voltage of the motor as a function of the current flowing through the motor.

2. A system according to claim 1, wherein the current flowing through the motor is determined by way of the voltage drop occurring across a resistor.

3. A system according to claim 2, wherein the resistor is thermally coupled with the electrical drive motor.

4. A system according to claim 1, further comprising means for detecting the operating temperature of the motor so as to put out a signal to the signal processing arrangement.

5. A system according to claim 1, further comprising an operating element for preselecting at least two different wiping speeds and the operating mode of the windshield wiper system.

6. A system according to claim 1, further comprising an additional switching stage for permitting emergency operation of the windshield wiper system upon a malfunction of the first-mentioned switching stage.

* * * * *